US008666605B2

(12) United States Patent
Delarche et al.

(10) Patent No.: US 8,666,605 B2
(45) Date of Patent: Mar. 4, 2014

(54) SECURING THE ASSISTANCE TORQUE BY MEANS OF AN ESTIMATOR OF THE FORCE ON THE RACK

(75) Inventors: Jocelyn Delarche, Villeurbanne (FR); Andre Michelis, Grigny (FR); Pierre Pilaz, Saint Marcel l'Eclaire (FR); Christophe Ravier, Saint Pierre de Chandieu (FR)

(73) Assignee: JTEKT Europe (FR)

( * ) Notice: Subject to any disclaimer, the term of this patent is extended or adjusted under 35 U.S.C. 154(b) by 0 days.

(21) Appl. No.: 13/817,923

(22) PCT Filed: Jul. 13, 2011

(86) PCT No.: PCT/FR2011/051684
§ 371 (c)(1),
(2), (4) Date: Feb. 20, 2013

(87) PCT Pub. No.: WO2012/022871
PCT Pub. Date: Feb. 23, 2012

(65) Prior Publication Data
US 2013/0151081 A1 Jun. 13, 2013

(30) Foreign Application Priority Data
Aug. 20, 2010 (FR) ...................................... 10 56691

(51) Int. Cl.
*G06F 19/00* (2011.01)
(52) U.S. Cl.
USPC ............... 701/42; 701/41; 180/427; 180/442; 180/443; 180/444; 180/446; 91/368; 91/467; 318/432; 318/434; 137/625.23

(58) Field of Classification Search
CPC ......................................................... B62D 5/04
USPC .............. 701/41, 42; 180/427, 442, 443, 444, 180/446, 428; 91/368, 375 A, 467; 74/422, 74/498; 318/432, 434; 137/5.18, 625.23
See application file for complete search history.

(56) References Cited

U.S. PATENT DOCUMENTS

| 7,555,402 | B2 * | 6/2009 | Barthomeuf et al. ......... 702/151 |
| 8,296,016 | B2 * | 10/2012 | Kasbarian et al. .............. 701/41 |
| 2003/0121716 | A1 * | 7/2003 | Yamada et al. ................ 180/446 |
| 2008/0097669 | A1 * | 4/2008 | Kasbarian et al. .............. 701/42 |
| 2008/0140340 | A1 * | 6/2008 | Barthomeuf et al. ......... 702/151 |
| 2009/0125187 | A1 * | 5/2009 | Yamamoto et al. ............. 701/42 |
| 2011/0040449 | A1 * | 2/2011 | Kasbarian et al. .............. 701/42 |

(Continued)

FOREIGN PATENT DOCUMENTS

| EP | 1172280 | A1 | 1/2002 |
| FR | 1172280 | * | 1/2002 |

(Continued)

OTHER PUBLICATIONS

Hosaka et al., Yaw Rate Control of Electric Vehicle using Steer-by-Wire System, 2004, IEEE, p. 31-34.*

(Continued)

*Primary Examiner* — McDieunel Marc
(74) *Attorney, Agent, or Firm* — Cantor Colburn LLP

(57) ABSTRACT

A method for securing the assistance torque (15) supplied by an electric assistance motor (8) in a motor vehicle power steering system includes the steps of: estimating the force on the steering system rack from the torque exerted by the driver on the steering wheel (2), from the assistance torque (15), and optionally from other parameters such as the speed of the electric assistance motor; comparing a target assistance torque with an authorized assistance range, defined with respect to the estimated rack force (17) at any moment, and in the event the target assistance torque is maintained above predefined limits for a predefined duration, correcting and optionally interrupting the power steering.

6 Claims, 4 Drawing Sheets

(56) References Cited

U.S. PATENT DOCUMENTS

| | | | |
|---|---|---|---|
| 2011/0089936 A1* | 4/2011 | Putinier | 324/207.25 |
| 2011/0184609 A1* | 7/2011 | Pilaz et al. | 701/41 |
| 2011/0257844 A1* | 10/2011 | Cassar et al. | 701/41 |
| 2011/0320090 A1* | 12/2011 | Barthomeuf et al. | 701/42 |
| 2012/0203397 A1* | 8/2012 | Michelis et al. | 701/1 |
| 2013/0024072 A1* | 1/2013 | Michelis et al. | 701/42 |

FOREIGN PATENT DOCUMENTS

| | | | |
|---|---|---|---|
| FR | 2909961 A1 | 6/2008 | |
| WO | 2006045910 A1 | 5/2006 | |
| WO | 2007031619 A1 | 3/2007 | |

OTHER PUBLICATIONS

Li qiang et al., Simulation of Driving Force Power Steering Control System Based on AMESim and Simulink, 2010, IEEE, p. 329-332.*

Spentzas et al., "E'EV", A Software to Estimate the Power and Torque Requirements and Evaluate the Performance of Electric Vehicle, 1995, IEEE, p. 553-557.*

International Search Report issued Mar. 6, 2012; re: PCT/FR2011/051684; pp. 2; citing: EP 1 172 280 A1 and FR 2 909 961 A1.

* cited by examiner

SECURING THE ASSISTANCE TORQUE BY MEANS OF AN ESTIMATOR OF THE FORCE ON THE RACK

TECHNICAL FIELD

The present invention generally relates to power steering systems for motor vehicles, systems in which an electric motor provides an assistance torque to facilitate the actions exerted by the driver on the steering wheel of the concerned vehicle.

More particularly, this invention relates to a method that procures securing of the assistance torque supplied by the electric assistance motor, by verifying that that torque is within a given assistance range.

BRIEF DESCRIPTION OF RELATED ART

FIG. 1 recalls the main elements making up a power steering system.

Such a steering system on the one hand comprises a mechanical part comprising a steering wheel 2 rotatably connected to a steering column 3, whereof the end that is distant from the steering wheel 2 bears a steering pinion engaged with a rack 4, slidably mounted in a steering gear-box 5.

The two opposite ends of the rack 4 are respectively connected, by connecting rods 6 and 7, to the right and left steered wheels (not shown) of the concerned motor vehicle.

To assist the manual force exerted by the driver of the vehicle on the steering wheel 2, the steering system comprises an electric assistance motor 8 with two directions of rotation, the output shaft of which is coupled to the steering column 3 by a reduction gear 9 in particular with a worm and tangent wheel, so as to transmit an engine torque (possibly also a resistive torque) to said steering column 3.

The electric assistance motor 8 is driven by an onboard electronic computer 10, which receives and processes various signals from the sensors.

In a typical embodiment, the electronic computer 10 receives an electrical signal from a sensor 11 of the angle of the steering wheel 2, which represents the instantaneous steering angle of the concerned motor vehicle, and that computer 10 also receives a signal from a torque sensor 12 placed on the steering column 3, and thereby measuring the torque exerted by the driver on the steering wheel 2.

In the illustrated example, a sensor 13 is also provided for the instantaneous position of the electric assistance motor 8.

From this various information, and possibly parameters outside the steering system, such as the speed of the vehicle, the electronic computer 10 drives the electric assistance motor 8, while defining a torque or assistance force at any moment, which can amplify or on the contrary offset the force applied by the driver on the steering wheel 2, according to predefined assistance laws or algorithms.

The majority of the assistance is provided based on the information from the torque sensor 12, and by means of algorithms defining a "target" assistance torque for the electric motor 8.

As examples of this state of the art, reference is made to patent documents WO 2006/045910 A1 and WO 2007/031619 A1 (in the applicant's name).

Under the current conditions, an electric power steering (EPS) system thus driven can lead to over-assistance phenomena, in other words excessive assistance, which risks leading to "auto-steering," or conversely "under-assistance," or even "counter-assistance."

BRIEF SUMMARY

The present invention aims to avoid these drawbacks, and therefore to avoid undesirable situations of over-assistance with auto-steering, and also under-assistance by an electric power steering system.

To that end, the invention essentially relates to a method for securing the assistance torque supplied by an electric assistance motor in a motor vehicle power steering system, the securing method comprising estimating the force on the steering system rack from the torque exerted by the driver on the steering wheel, from the assistance torque, and optionally from other parameters such as the speed of the electric assistance motor; comparing a "target" assistance torque with an authorized assistance range, defined with respect to the estimated rack force at any moment, and in the event the target assistance torque is maintained above predefined limits for a predefined duration, correcting and optionally interrupting the power steering.

In particular, the present invention provides an authorized abnormal range for operating in over-assistance mode, for which the target assistance torque is above a first authorized assistance threshold torque of the given assistance range, that assistance threshold being defined relative to the estimated rack force, and an authorized abnormal range for operating in under-assistance mode, for which the target assistance torque is below a second given assistance torque threshold, that assistance threshold being defined relative to the estimated rack force, an authorized abnormal range for operating in counter-assistance mode, the persistence of the target assistance torque in these ranges throughout the predefined duration causing a corrective action on the power steering assistance.

In particular, when the target assistance torque is greater than the first given assistance torque, for a predefined period of time, which indicates over-assistance, the assistance supplied will first be limited, then possibly interrupted so as to avoid an undesirable auto-steering phenomenon.

Conversely, when the target assistance torque is lower than the second given assistance torque, for a predefined period of time, which indicates under-assistance, the supplied assistance will be increased so as to procure minimum security-type assistance, limiting the under-assistance phenomenon.

In particular, when the target assistance torque is situated in the abnormal counter-assistance operating range, during a predefined period of time, the assistance supplied will be decreased, then possibly interrupted.

The predefined authorization period to supply assistance, in particular the authorized over-assistance operating range, is not necessary constant; advantageously, this predefined period is variable, in particular decreasing as a function of the value of the deviation between the target assistance torque and the assistance threshold defined relative to the estimated rack force.

BRIEF DESCRIPTION OF THE DRAWINGS

The invention will be better understood using the following description, in reference to the appended diagrammatic drawing illustrating, as an example, one embodiment of this method for securing the assistance torque.

DETAILED DESCRIPTION

Figure 1:
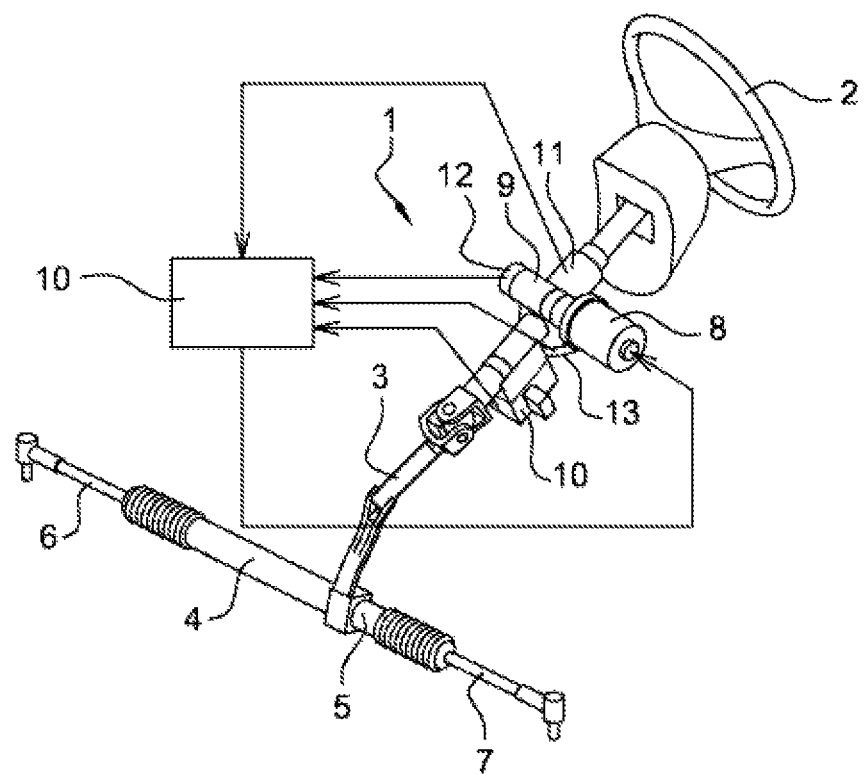
FIG. 1 (already mentioned) is a diagrammatic perspective side view of a power steering system capable of implementing the method according to the invention.

The first step of the method according to the invention comprises estimating the force applied on the rack of the steering system.

To that end, the steering wheel torque 14 brought to a rack force and measured by the torque sensor 12 is added to the assistance torque 15 of the electric motor 8 brought to the rack.

This rack force is then filtered to obtain the estimate 16 of the rack force at a given moment.

Figure 3:
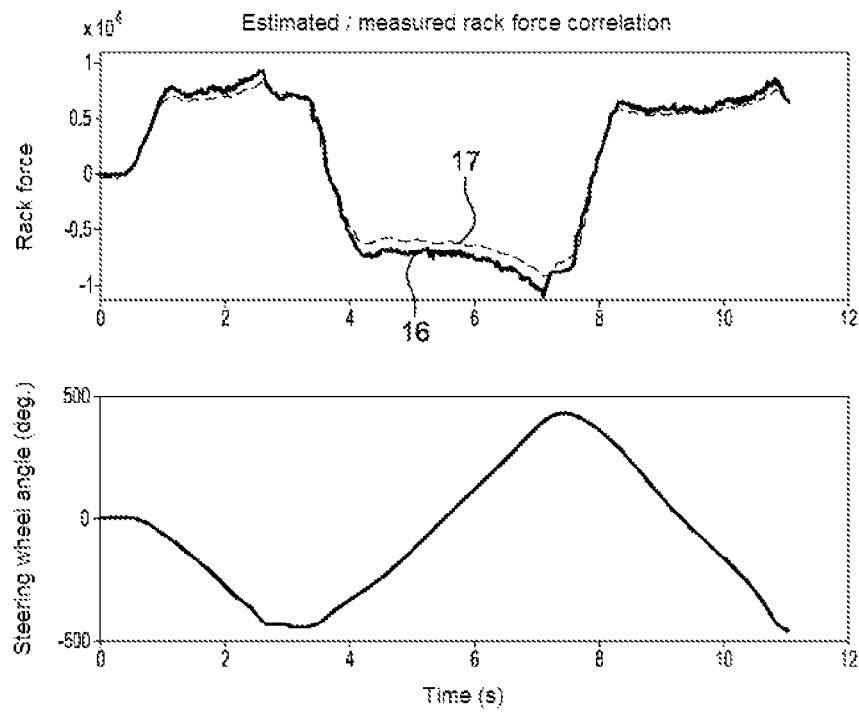
FIG. 3 shows a comparison of the measured rack force and the rack force estimated according to the steering angle.

As illustrated in FIG. 3, this estimate 16 is very close to the rack force actually measured 17 irrespective of the angular position of the steering wheel 2.

Figure 2:
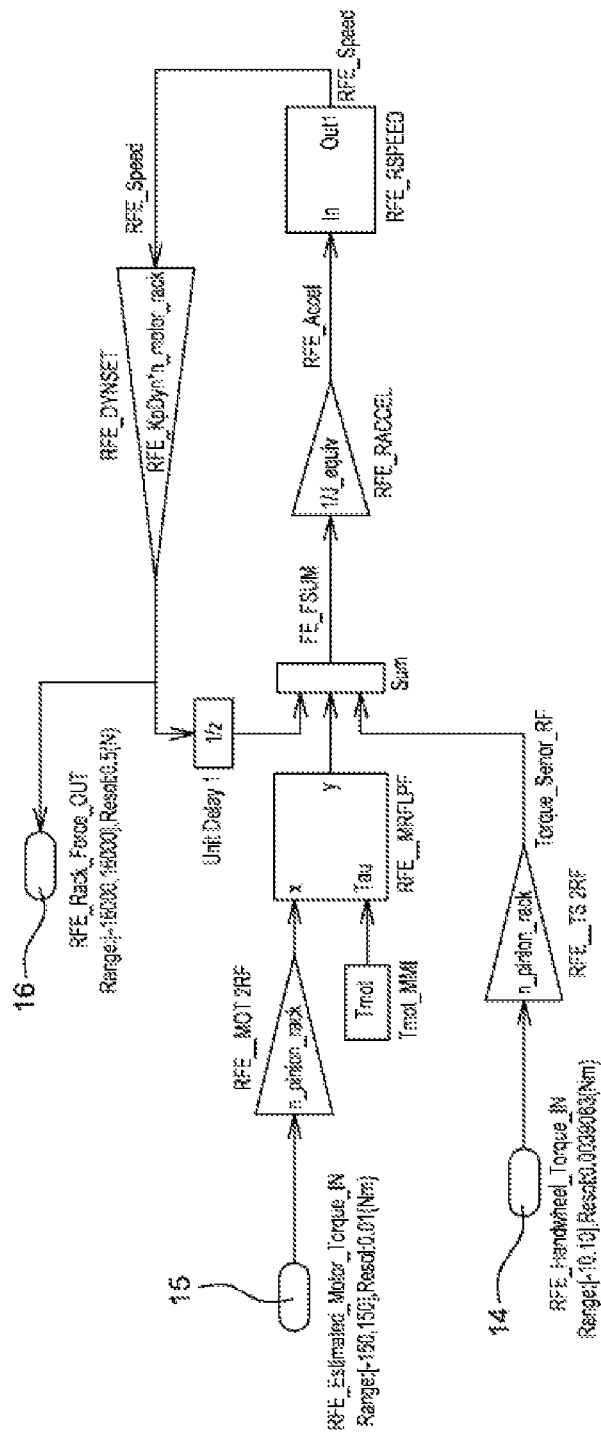
FIG. 2 illustrates the algorithm used to estimate the rack force.

The algorithm illustrated in FIG. 2 aims to define the minimum and maximum boundaries of the target assistance torque.

To that end, the algorithm defines a first authorized range 18, shown in FIG. 6, where the target assistance torque is greater than the rack force, thereby defining an authorized over-assistance range, and a second authorized range 19, also shown in FIG. 6, where the target assistance torque (Y-axis in FIG. 6) is below the rack force, thereby defining an authorized under-assistance range.

Figure 4:
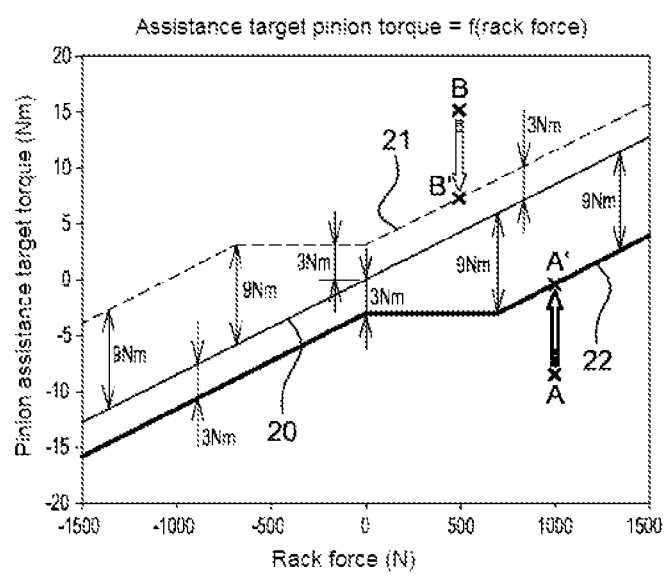
FIG. 4 illustrates example embodiments of the method according to the invention.

The algorithm used in the method according to the invention thus defines three curves shown in FIG. 4.

A first curve 20 defines the assistance torque according to the rack force. In other words, if the assistance torque actually supplied by the system is on that curve, the latter will accurately offset the rack force.

A second curve 21 for the rack forces in the positive angular direction of the steering wheel 2 is parallel to the first curve 20, but offset in the example shown in FIG. 4 by +3N.

This second curve 21 defines the upper limit of a functional range 23 beyond which the target assistance force is higher than the rack force.

A third curve 22 still for the rack forces in the positive angular direction of the steering wheel 2 is parallel to the first curve 20, but offset in the example shown in FIG. 4 by −3N to −9N.

This third curve 22 defines the lower limit of the functional range 23 below which the target assistance force is lower than the rack force.

The logic is the same for a rack force in the negative angular direction of the steering wheel 2 (central symmetry of the curves).

For a rack force in the positive direction of the steering wheel 2, when the target assistance torque is below the minimum defined by the third curve 22 (point A), the target assistance actually applied will be increased so as to supply a minimum security assistance (point A') limiting the under-assistance phenomenon.

The same is true when the target assistance torque is above the maximum defined by the second curve 21 (point B): the target assistance actually applied will first be limited so as to limit the over-assistance (point B'), then secondly cut so as to avoid an auto-steering phenomenon.

Figure 5:
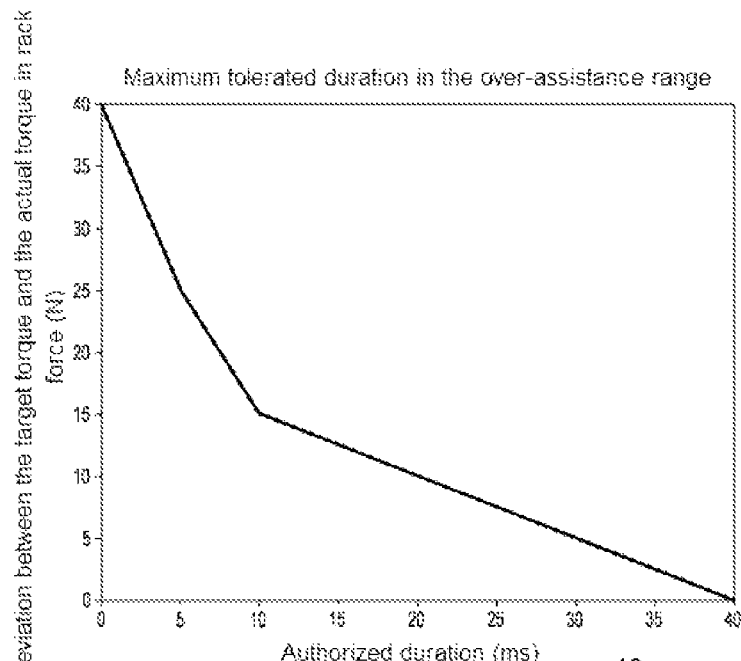
FIG. 5 shows a curve describing the authorized over-assistance operating time.

As illustrated in FIG. 5, the duration before assistance cutoff depends on the deviation between the target assistance torque and the torque actually applied.

In this figure, the curve is made up of three straight segments with different slopes.

Thus, for a torque deviation comprised between 25N and 40N, the authorized duration before cutoff of the assistance will be less than 5 ms. For torque deviations comprised between 15N and 25N, this period will be comprised between 5 ms and 10 ms, and for torque deviations comprised between ON and 15N, this period will be comprised between 10 ms and 40 ms.

The authorized period is proportional to the torque deviation in these three regions of the curve.

Thus, the larger the torque deviation, the more the quickly the assistance is cut, which secures the assistance torque of the electric motor 8.

Figure 6:
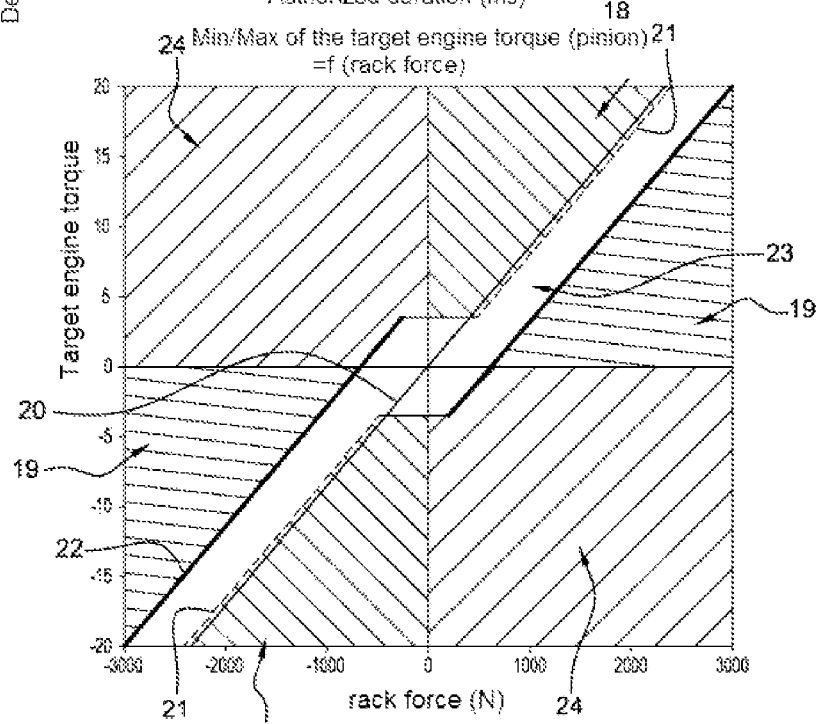
FIG. 6 shows the various ranges shown by the method according to the invention.

FIG. 6 brings together the various curves and ranges defined above with a curve 21 limiting the functional region 23 situated slightly lower for the positive rack forces, and slightly higher for the negative rack forces, than the curve 20 in which the assistance torque accurately offsets the rack force.

In that case, the upper limit of the assistance torque 15 is reached quickly, which returns the control of steering of the wheels to the sole rotation of the steering wheel 2 by the driver.

This figure also shows ranges 24 where the assistance torque is resistant and opposes the rotation of the steering wheel 2 by the driver.

Some of the curves 22 defining the under-assistance limits in the positive and negative rack force directions protrude into these ranges 24, thereby widening the functional range 23 inside said ranges 24.

Thus, for small movements of the steering wheel 2, the electric assistance motor 8 will oppose that movement slightly, which makes it possible to retain the steering wheel 2 for better driving comfort for the driver.

Although the invention has been described relative to particular examples of embodiments, it is of course in no way limited thereto and encompasses all technical equivalents of the described means.

The invention claimed is:

1. A method for securing an assistance torque supplied by an electric assistance motor in a motor vehicle power steering system, the securing method being comprising:

estimating, by a processor the force on the steering system rack from the torque exerted by the driver on the steering wheel, from the assistance torque, and optionally from other parameters including a speed of the electric assistance motor, comparing, processor a "target" assistance torque with an authorized assistance range, defined with respect to the estimated rack force at any moment, and in the event the target assistance torque is maintained above predefined limits for a predefined duration, correcting and optionally interrupting the power steering.

2. The method for securing the assistance torque according to claim 1, comprising an authorized abnormal range for operating in over-assistance mode, for which the target assistance torque is above a first authorized assistance threshold torque of the given assistance range, that assistance threshold being defined relative to the estimated rack force, and an authorized abnormal range for operating in under-assistance mode, for which the target assistance torque is below a second given assistance torque threshold, that assistance threshold being defined relative to the estimated rack force, an authorized abnormal range for operating in counter-assistance mode, the persistence of the target assistance torque in these ranges throughout the predefined duration causing a corrective action on the power steering assistance.

3. The method for securing the assistance torque according to claim 2, wherein when the target assistance torque is greater than the first given assistance torque, for a predefined period of time, which indicates over-assistance, the assistance supplied will first be limited, then possibly interrupted so as to avoid an undesirable auto-steering phenomenon.

4. The method for securing the assistance torque according to claim 2, wherein when the target assistance torque is lower than the second given assistance torque, for a predefined period of time, which indicates under-assistance, the supplied assistance will be increased so as to procure minimum security-type assistance, limiting the under-assistance phenomenon.

5. The method for securing the assistance torque according to claim 2, wherein when the target assistance torque is situated in the abnormal counter-assistance operating range, during a predefined period of time, the assistance supplied will be decreased, then possibly interrupted.

6. The method for securing the assistance torque according to claim 1, wherein the predefined period is variable, and decreasing as a function of the value of the deviation between the target assistance torque and the assistance threshold defined relative to the estimated rack force.

\* \* \* \* \*